United States Patent Office 2,874,168
Patented Feb. 17, 1959

2,874,168

PROCESS FOR THE PREPARATION OF 1-NITROANTHRAQUINONE

David E. Graham and Eugene V. Hort, Westfield, N. J., assignors to General Aniline & Film Corporation, New York, N. Y., a corporation of Delaware No Drawing. Application April 2, 1957
Serial No. 650,084

1 Claim. (Cl. 260—369)

The invention here disclosed presents a new, useful, and very simple method of producing 1-nitroanthraquinone of high purity and high yield by a new and unexpected simplification of the process for manufacturing the substance.

1-nitroanthraquinone is a very important reagent in the manufacture of a wide range of dyestuffs, pharmaceuticals, and the like, being used either as such, or after reduction to 1-aminoanthraquinone. However, in the past the material has been prepared by the use of a mixture of sulfuric and nitric acids or with hot concentrated nitric acid, following the standard and customary nitration procedure. But this method of preparation is seriously unsatisfactory because of the production of considerable quantities of isomeric dinitroanthraquinones for which there is little or no use, and which in addition interferes seriously with the use of the mononitroanthraquinone, as well as unnitrated anthraquinone so that the process is unsatisfactory both because of the wastage of somewhat costly material and the necessity for a difficult purification step. Many variations on this procedure have been tried and none have been found satisfactory since none yield a pure preparation. These defects appear to be due to the fact that the nitration in the presence of sulfuric acid or at high temperatures is not very selective and a second nitro group substitutes, chiefly in the 5- or 8-positions, long before mononitration is complete. As a result there is a considerable group of different compounds produced from which the separation of pure 1-nitroanthraquinone is difficult and expensive. The resulting impurities must be removed since they interfere with the use of the nitro compound as an intermediate, and since all of the nitro compounds tend to be more or less completely reduced, a similar wide range of amino compounds are likewise produced, which again are useless for most of the reactions leading to the preparation of desired dyestuffs and pharmaceuticals. The difficulties in the prior art are well shown by such publications as Beisler and Jones, J. Am. Chem. Soc. 44, 2296 (1922), who critically reviewed the nitration of anthraquinone and reported that all previous methods gave products of low purity. In order to purify 1-nitroanthraquinone they resorted to successive crystallization from three different solvents and in consequence obtained only a 40% yield.

As further evidence of the impurity of 1-nitroanthraquinone prepared by nitration of anthraquinone, Whelen, U. S. 2,302,729, November 24, 1942, describes a method of purification of crude 1-nitroanthraquinone prepared by direct nitration. Such purification entails additional expense and reduces the yield of product obtained. Also Coffey, Chemistry and Industry 1953, 1068, in reviewing the reactions of anthraquinone, states that the purest 1-nitroanthraquinone obtainable by direct nitration, on reduction gives an amine containing nearly 10% of di-amino-compounds. Such an impure product is not suitable for most of the uses of this compound. Again purification is expensive and yield-consuming.

Clearly then it has previously been believed that high temperatures or a strong acid catalyst were required for nitration of anthraquinone.

According to the present invention it is now found that these requirements do not in fact hold, and that, nitric acid alone, and in the cold, nitrates anthraquinone at a good rate of speed to produce a preparation of high purity ranging from 95–99% in yield. This material is suitable for further use without purification and its attendant cost and difficulties.

Accordingly what this application discloses is for the first time a method of nitrating anthraquinone to obtain pure 1-nitroanthraquinone. This is suitable without purification for reduction to pure 1-aminoanthraquinone. The yields are extremely high.

Thus by the steps in the present invention, omitting sulfuric acid, and reducing the temperature to room temperature, there is obtained simultaneously, freedom from impurities, high yield of the desired 1-nitroanthraquinone, freedom from the necessity of purification and a very important reduction in cost. In addition the material may be reduced to the amino compound without an intervening purification step, thereby yielding a 1-aminoanthraquinone in high yield, high purity, and the low cost.

Thus the process of the present invention produces a 1-nitroanthraquinone by simple treatment of the anthraquinone with nitric acid in the absence of sulfuric acid or other assisting agents of any sort, and at low temperatures to produce a previously unobtainable purity, efficiency and percentage yield. Other objects and details of the invention will be apparent from the following description.

The primary raw material for the process of the invention is anthraquinone. It is found that the usual grade of commercial anthraquinone is satisfactory.

The second component of the invention is nitric acid. It is found that a desirable grade of nitric acid contains approximately 96% $HNO_3$. However, the acid concentration is by no means critical, and acid as low as 90% and even lower is usable although the reaction is slow; and acid of a 100% or above, that is, fuming nitric acid, is equally usable.

The third item in the process is the temperature which is preferably maintained between 20–25° C. although temperatures as low as 15° C., 10° C., 5° C., or even 0° C. are usable although the reaction is somewhat slower, and temperatures as high as 30° C. or somewhat higher are also usable, although at temperatures above about 40° C. there is a tendency to produce dinitro compounds and other impurities.

In practicing the invention the anthraquinone is delivered into an excess of nitric acid, and the mixture stirred at a temperature of approximately 25° C. as above indicated, for a time interval which may range from 36 hours to 100 hours according to the temperature and acid concentration. When the reaction is complete, the reaction mixture is desirably poured into ice water containing a considerable amount of ice to dilute the excess of acid, whereafter the material may be filtered out and washed free of acid with additional portions of cold water.

The resulting product is then a highly desirable raw material, useful, without further purification, for conversion into 1-aminoanthraquinone.

The process is well exemplified by the following examples which are offered as showing merely the preferred method of practicing the invention, not as imposing any limitations upon the claims solicited.

*Example 1*

208 g. (1.0 mol) of anthraquinone was stirred at 25° C. for 72 hours in 500 ml. of 96.4% nitric acid. The product was drowned into 1000 g. of ice and 1500 ml. of water, filtered and the precipitate washed free of acid with cold water.

The washed 1-nitroanthraquinone was slurried in 4 liters of water and added over 30 minutes to 2500 g. of 16% sodium sulfide solution preheated to 95° C. The slurry was stirred 1 hour at 95° C., filtered and the precipitate washed neutral with hot water.

After drying 24 hours at 95° C., 216 g. (96.5% of theory, overall) of 1-aminoanthraquinone was obtained; assay by diazo, 99.5% pure; by spectroscope, similar to standard.

*Example 2*

The same procedure as Example 1 was used except 18 hours at 45° C. instead of 72 hours at 25° C. The product contained 34% diaminoanthraquinone by diazo assay.

This example shows the effect of an elevated temperature in the production of diaminoanthraquinone and shows the desirability of keeping the temperature consistently below 40° C.

*Example 3*

208 g. (1.0 mol) of anthraquinone was stirred at 25° C. for 18 hours in 2000 g. of sulfuric acid containing 63 g. (1.0 mol) of nitric acid.

After working up the product in the manner described in Example 1, except that 4-fold quantities of ice and water were required, a yield of 198 g. of product was obtained. Analysis showed that this contained about 10% of dinitro compounds and 10% of unreacted anthraquinone.

This example shows the effect of carrying out the reaction in sulfuric acid, and the impure product that is formed.

Thus the process of the invention produces an outstandingly pure grade of 1-nitroanthraquinone by the simple procedure of omitting sulfuric acid and keeping the temperature below a critical value of about 40° C.

While there are above disclosed but a limited number of the embodiments of the process of the present invention, it is possible to provide still other embodiments without departing from the inventive concept herein disclosed, and it is therefore desired that only such limitations be imposed upon the appended claim as are stated therein or required by the prior art.

The invention claimed is:

The process for producing 1-nitroanthraquinone from anthraquinone which comprises, intimately mixing at approximately 25° C. anthraquinone with a nitrating agent consisting of an excess of nitric acid having a strength within the range of 90 to 115%, continuing said mixing while maintaining the temperature at approximately 25° C. from 12 to 100 hours until the mono-nitration of the anthraquinone is substantially complete whereby 1-nitroanthraquinone is produced and thereafter drowning the reaction mixture in ice water to precipitate the 1-nitroanthraquinone and recovering said 1-nitroanthraquinone.

References Cited in the file of this patent

UNITED STATES PATENTS 1,758,855   Schmidt _____ May 13, 1930

OTHER REFERENCES

Beisler et al.: Journal Amer. Chem. Soc. 1922, vol. 44, page 2303.